(12) United States Patent
Zhou et al.

(10) Patent No.: US 9,030,548 B2
(45) Date of Patent: May 12, 2015

(54) CORRECTION OF A FIELD-OF-VIEW OVERLAY IN A MULTI-AXIS PROJECTION IMAGING SYSTEM

(71) Applicant: DMetrix, Inc., Tucson, AZ (US)

(72) Inventors: Pixuan Zhou, Tucson, AZ (US); Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 321 days.

(21) Appl. No.: 13/803,936

(22) Filed: Mar. 14, 2013

(65) Prior Publication Data

US 2013/0242079 A1   Sep. 19, 2013

Related U.S. Application Data

(60) Provisional application No. 61/612,180, filed on Mar. 16, 2012.

(51) Int. Cl.
*G02B 21/00* (2006.01)
*G02B 21/36* (2006.01)

(52) U.S. Cl.
CPC ................... *G02B 21/367* (2013.01)

(58) Field of Classification Search
CPC .................................................. G02B 21/367
USPC ........................................................ 348/80
See application file for complete search history.

(56) References Cited

U.S. PATENT DOCUMENTS

2004/0057094 A1 *   3/2004   Olszak et al. ............... 359/198

* cited by examiner

*Primary Examiner* — Sath V Perungavoor
*Assistant Examiner* — Jeffery Williams
(74) *Attorney, Agent, or Firm* — Yakov Sidorin; Quarles & Brady LLP

(57) ABSTRACT

Two-dimensional scanning array microscope system, which has fields of view of individual objectives overlapping at the object, produces a composite image of the object that is devoid of optical distortions caused by such overlapping. Method for processing imaging data with the system includes precise identification of detector pixels corresponding to different portions of multiple image swaths projected on the detector by the system during the scan of the object, and, based on such identification, allocating or assigning of detector pixels that receive light from the object through more than one objective to only one of objectives, thereby correcting imaging data received in real time to remove a portion of data corresponding to image overlaps.

14 Claims, 12 Drawing Sheets

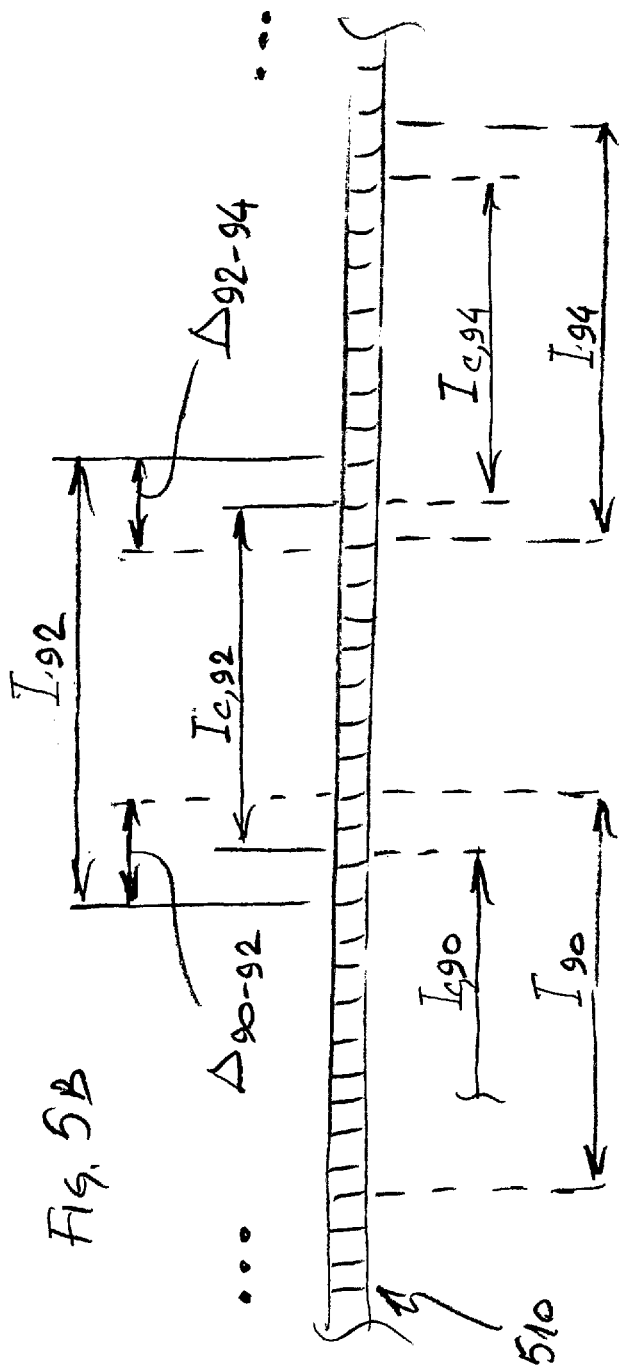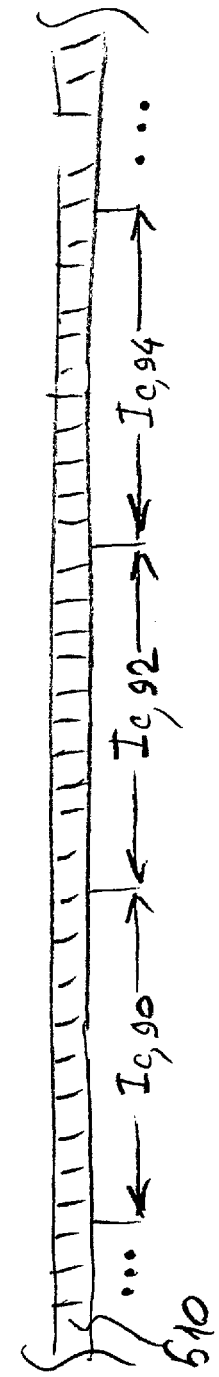

CORRECTION OF A FIELD-OF-VIEW OVERLAY IN A MULTI-AXIS PROJECTION IMAGING SYSTEM

CROSS-REFERENCE TO RELATED APPLICATIONS

This application claims the benefit of and priority from the U.S. Provisional Patent Application No. 61/612,180 filed on Mar. 16, 2012 and titled "FOV Geometry and Correction of Array Objectives", the entire contents of which are hereby incorporated by reference for all purposes.

TECHNICAL FIELD

The present invention relates to a light microscopy. More specifically, this invention relates to multi-axis imaging systems, particularly an array of imaging systems which can scan an entire specimen of a microscope slide in a single pass.

BACKGROUND ART

A multi-axis imaging system employing an array of optical imaging elements is a recent development. Related U.S. Patent Application No. 60/276,498; International Patent Application No. PCT/US02/08286; and U.S. Pat. No. 7,061,584, for example, disclose novel method and apparatus for rapidly obtaining an image of an entire slide using an array microscope. In general, this is a multiple-optical-axis, or multi-axis, imaging system having a plurality of imaging elements arranged in an array, each imaging element having one or more optical elements disposed along the optical axis of the array. Where the imaging elements are microscopes, the system is referred to as an Array Microscope (AM), or miniature microscope array (MMA) since the imaging elements are preferably very small.

In a multi-axis imaging system such as an MMA, where the imaging elements are closely packed, constructing a composite image of the entire object that is uniform and artifact-free from images formed by individual objectives remains problematic. In particular, to ensure that every region of the object is imaged, during the scanning operation of the multi-axis MMA, with at least one of the objectives of the objective array of the MMA, these objectives are arranged in a redundant spatial fashion. In particular, the objectives are placed in such a spatial pattern that results in overlapping, in the object plane, of traces across the object of at least some of the fields-of-view (FOVs) of at least some of the objectives. For the purposes of this disclosure, the FOV of an individual imaging in an object space is defined as the projection of an image-plane sensor or a segment of an image-plane sensor (detector) associated with the individual imaging system into the object space, for example into an object plane that is conjugate to the image plane where the image plane detector is located. As a result of the spatial overlapping of the traces of at least some of the FOVs in the object plane, in the image plane the aggregate, initial image formed by the array of objectives includes image portions that contain images of the same object region but by different objectives. Overlapping in the image plane, such image portions are registered twice by the same of the detector pixels and create unwanted artifacts referred to herein as "image overlap", making it difficult to precisely analyze the object based on the imaging data.

Accordingly, in a situation where, due to hardware constraints, it is problematic to avoid overlapping of the paths of the FOVs that the two individual objectives of the AM trace in the object plane during the scanning operation of the AM, there remains a need to have the AM system appropriately normalized and/or calibrated. The goal of such normalization and/or calibration is to determine which of the detector pixels associated with a region of the image overlap to assign to operating with one of the two objectives, and which remaining pixels to assign to operate with another of the two objectives.

SUMMARY OF THE INVENTION

Embodiments of the invention provide a scanning array microscope system and a method for correcting an image formed with an array of objectives of the array microscope system to ensure that no imaging distortion is present that is cause by an overlap of the fields-of-view of multiple objectives in the object space.

Embodiments of the invention provide a method of combining multiple swaths of images acquired with a scan of an object with an array microscope, which method includes (i) providing a two-dimensional microscope array with a plurality of magnifying imaging systems disposed along a corresponding plurality of optical axes and enabling formation of an image of the object on a detector, the plurality of magnifying imaging systems being arranged in a magnifying imaging systems array, the detector including a plurality of linear pixel arrays, and (ii) providing a scanning mechanism enabling a relative movement between the microscope array and the object, which scanning mechanism is operable along a direction of scan across the object. The positioning of magnifying imaging systems in the magnifying imaging systems array is such that each of the magnifying imaging systems acquires image data corresponding to a respective continuous strip of the object along the direction of scan. The linear pixel arrays are extended transversely to the linear direction of scan. The method also includes scanning the object to define multiple image swaths of the object. Each image swath has a width defined by a field of view of a corresponding magnifying imaging system in the array of magnifying imaging systems and a length defined by said direction of scan across the object. He method additionally includes acquiring imaging data (with each pixel array) that represents individual images corresponding to intersections of multiple image swaths, formed by magnifying imaging systems, with each linear pixel array. He method further includes determining spatial extents of the individual images and spatial offsets between the immediately-neighboring individual images from the acquired data, and registering the determined spatial extents and spatial offsets with respect to pixels of each linear pixel array to derive pixel parameters that enable a removal of distortions in imaging data representing the multiple image swaths. Furthermore, the method includes processing the imaging data with data-processing circuitry of the microscope array to produce a composite image of the object based on said pixel parameters.

Embodiments of the invention additionally provide an array microscope system that includes (i) a two-dimensional scanning microscope array with a plurality of magnifying imaging systems disposed along a corresponding plurality of optical axes and enabling formation of an image of the object on a detector, the plurality of magnifying imaging systems being arranged in rows, the detector including a plurality of linear pixel arrays, and (ii) a microprocessor in operable communication with the two-dimensional microscope array. The rows of magnifying imaging systems are staggered with respect to a linear direction of scan of the magnifying imaging system across the object to organize the magnifying imaging systems in a substantially hexagonal pattern such that each of the imaging systems acquires image data corresponding to a respective continuous strip of the object along the linear direction of scan. The linear pixel arrays are mutually parallel and each is extended transversely to the linear direction of scan. The microprocessor is programmed to (a) acquire imaging data, received from each chosen linear pixel array as a result of scanning of the object along the linear direction of scan, where the acquired data represents individual images corresponding to intersections of image swaths (which are formed by magnifying imaging systems organized in a row) with each chosen linear pixel array. The microprocessor is further configured to determine spatial extent of each of the individual images and spatial offsets between the immediately-neighboring individual images from the acquired data; and to register the determined spatial extents and spatial offsets with respect to pixels of each chosen linear pixel array to derive pixel parameters enabling a removal of distortion in imaging data. Furthermore, the microprocessor is programmed to seamlessly stitch multiple swaths of images (that have been digitally corrected with the use of the derived pixel parameters) to produce a composite image of the object that is devoid of image portions corresponding to imaging of the object with more than one magnifying imaging system.

BRIEF DESCRIPTION OF THE DRAWINGS

The invention will be more fully understood by referring to the following Detailed Description in conjunction with the Drawings, of which:

FIGS. 5B and 5C are diagrams representing the process of forming a portion of a composite image corresponding to a single linear pixel array from individual instantaneous images registered by such pixel array;

DETAILED DESCRIPTION

Figure 1:
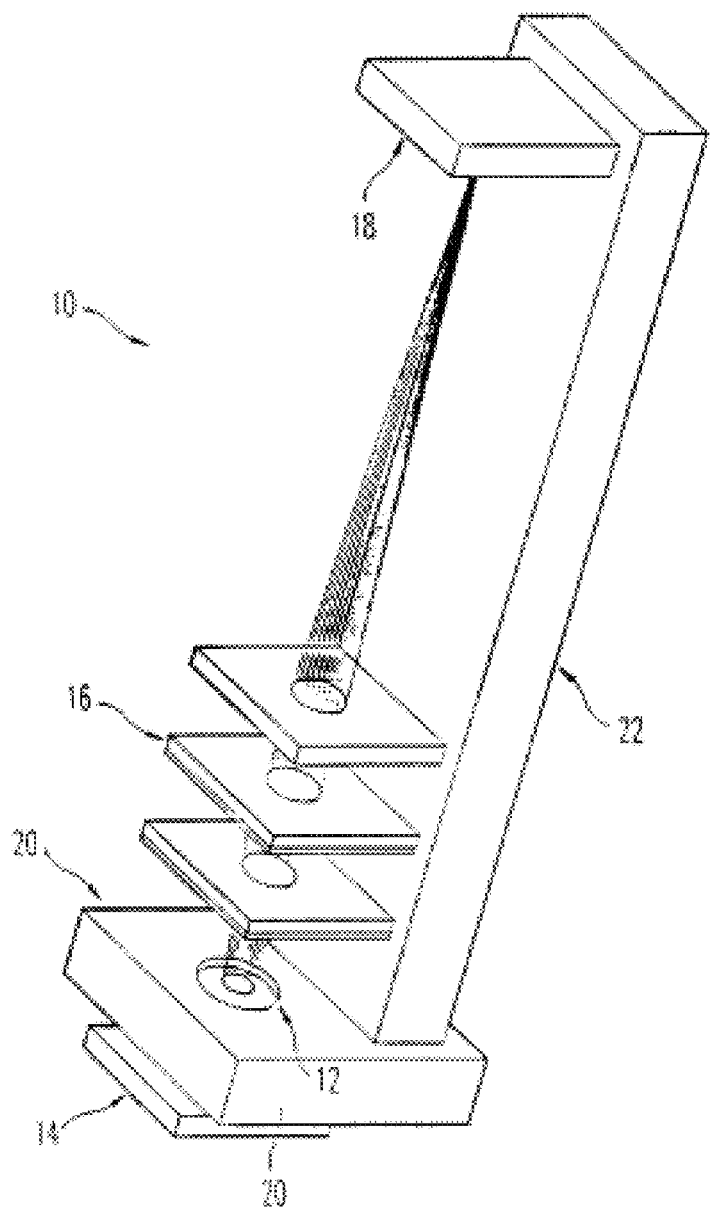
FIG. 1 is a diagram depicting a single miniaturized microscope in an AM.

The invention was motivated by the realization that the images produced by data acquisition using an AM cannot be combined directly to produce a uniform composite image because of the unavoidable data incompatibilities produced by spatial arrangement of the various microscope objective in the AM. According to the idea of the invention, the appropriate calibration of the AM system is required to compensate for such data incompatibilities. Images from at least some of the individual objectives of the AM, formed as a result of a single scan of the AM system, need to be cropped to be properly stitched with neighboring images in order to create a substantially artifact-free final composite image. If the image from an individual objective is incorrectly cropped even by a single pixel, the composite image (that results from the stitching of many images) may contain image gaps and/or remaining regions of image overlap. The AM calibration performed according to the method of the invention results in identification of the detector pixels the information from which should be ignored in the final concatenated image in order to make such image devoid of image artifacts resulting from duplicative imaging of the same portion of the object with adjacent objective of the AM system. In context of the present disclosure, the term "artifact-free image" refers to the spatially uninterrupted image that is devoid of an image region containing images of the same portion of the object but produced by two different microscope objectives of the scanning AM system. The AM calibration, therefore, should address the image analysis on a pixel by pixel basis. The method of calibration includes the used of reference objects, referred to as FOV calibration slides, to determine boundaries for image corresponding to an individual objective.

References throughout this specification have been made to "one embodiment," "an embodiment," "a related embodiment," or similar language. Such references mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same implementation of the inventive concept. It is to be understood that no portion of disclosure, taken on its own and in possible connection with a figure, is intended to provide a complete description of all features of the invention.

It is to be understood that no single drawing used in describing embodiments of the invention is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

The invention as recited in claims appended to this disclosure is intended to be assessed in light of the disclosure as a whole, including features disclosed in prior art to which reference is made.

The AM according to an embodiment of the present invention includes an array of miniaturized microscopes such that the AM is configured to scan a width of a microscope slide containing an object (for example, a pathological specimen). Referring now to the drawings, wherein like reference numerals designate identical or corresponding parts throughout the several views, FIG. 1 shows a schematic of an individual miniaturized microscope 10. In context of the present disclosure, the term "microscope" is used with reference to both the array microscope and the individualized microscope component of the AM that employs an individual microscope objective, and it is assumed that the distinction will be apparent to those skilled in the art from the context of the description. Each microscope 10 includes an objective lens 12 adjacent to a cover plate 14, an image sensor portion 18, and optionally at least one refractive plate 16. (Qualitatively, the use of multiple refractive plates 16 increases the field of view and improves image quality of each microscope 10). A specimen (i.e., the object to be imaged) is located beneath the cover plate 14. In addition, the objective lens 12 and at least one additional optical element (for example, a refractive plate 16) function together as one optical system, designed to control aberrations.

The objective lens 12 may be held by a base plate or substrate 20. Trans-illumination of the object across the field of view or epi-illumination peripheral to the field of view along the base plate 20 illuminates the object for each miniaturized microscope. As shown in FIG. 1, a micro-optical table 22 (MOT) serves as a support for each microscope. The MOT 22 supports the base plate 20, the optional refractive plates 16, and the image sensor 18. Optical elements such as for example lenses, fiber optics, mirrors, and detectors can be mounted on the base plate 20.

The number of miniaturized microscopes needed to cover an entire width of a microscope slide depends on the ratio of microscope-slide width (e.g., a microscope slide width of 20 mm) to the FOV diameter of each microscope imaging system in the array. A smaller ratio requires fewer microscopes in the array. A typical FOV for an individual microscope is on the order of 200 microns in diameter. As a result, in this example, approximately 100 miniature microscopes are needed to image a microscope slide with a width of 20 mm.

Figure 2A:
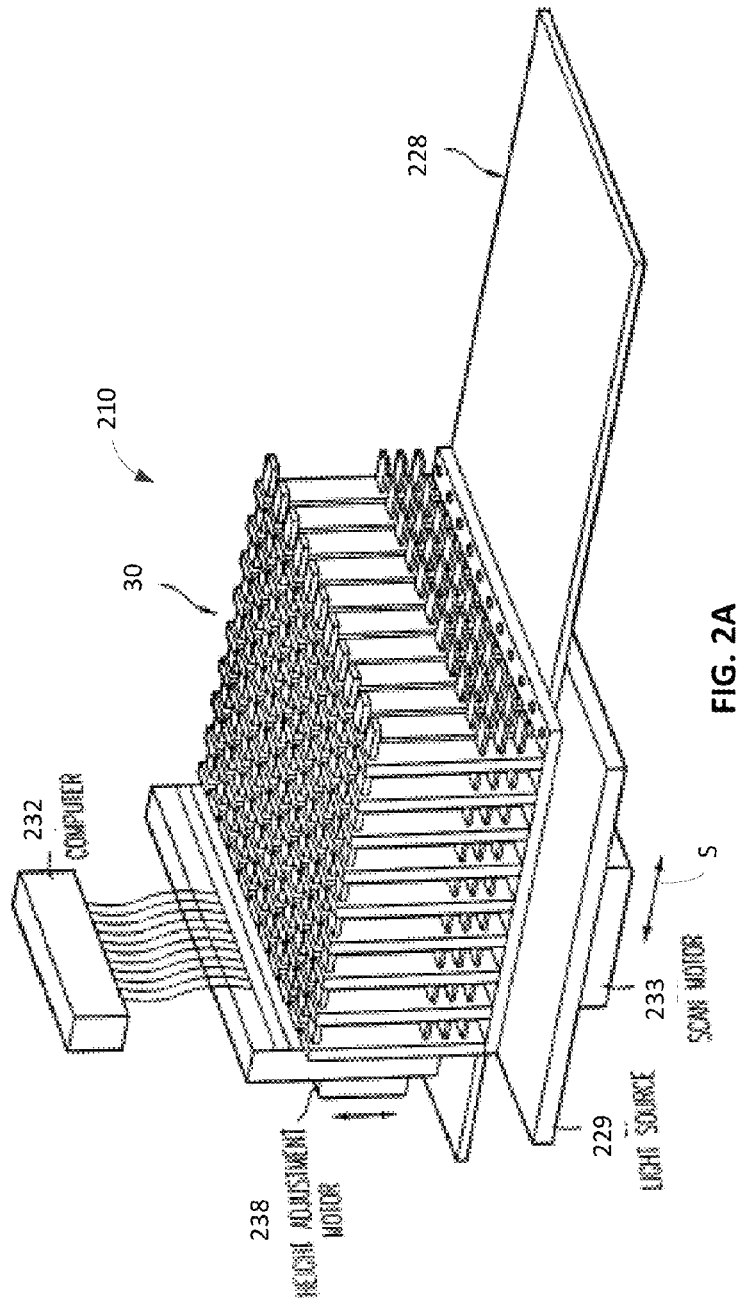
FIG. 2A is an isometric view of an AM with several tens of miniaturized microscopes.
Figure 2B:
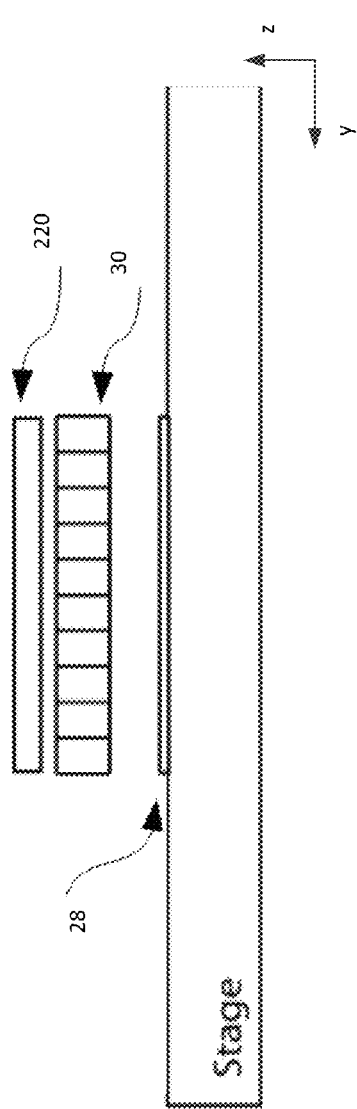
FIG. 2B is a simplified side view of the embodiment of FIG. 2A.

An embodiment of the AM depicted in FIG. 2A shows a completed AM 30 with a spacing between adjacent microscopes on the order of 2 mm. The AM 30, as shown in FIG. 2A to be part of the automated microscope system 210, scans via a scan motor 233 longitudinally, in S-direction, across the slide 228 imaging the object on the microscope slide 228. Alternatively, the scan motor 233 could move the slide 228 under a stationary AM. The scanning motion may be continuous or the scanning motion may be step-and-image, in which case the microscope slide 228 is advanced in steps less than or equal to the FOV diameter of an individual microscope 10, an image is recorded, and the next step is taken. A light source 229 trans-illuminates or epi-illuminates the object on the slide. For epi-illumination, light can be transmitted to the object by light guides on the base plate 20 holding the objective lens 12. For completeness of illustration, FIG. 2B shows schematically mutual orientation of some of the components of the AM 30 of FIG. 1 in side view. The object under the microscope slide is to be imaged with the AM 30 onto a detector array 220, juxtaposed with the data acquisition board (not shown).

Figure 2C:
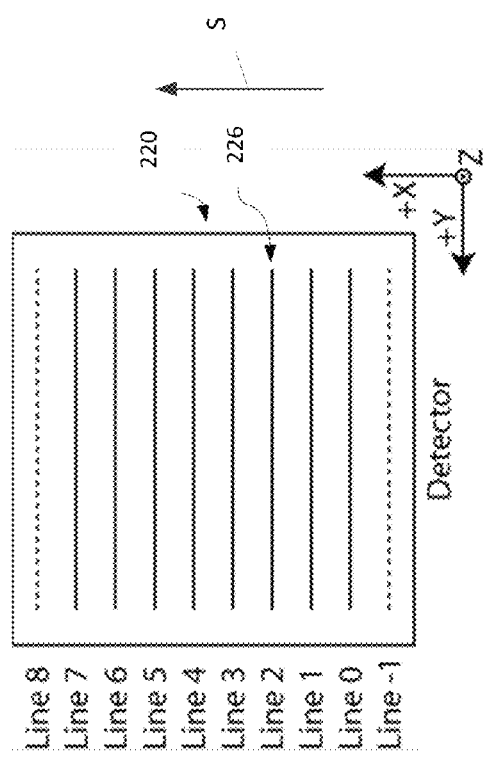
FIG. 2C is a plan top view of a detector of the embodiment of FIG. 2A, in which detector pixels are arranged in linear arrays oriented transversely to the direction of scanning.
Figure 3:
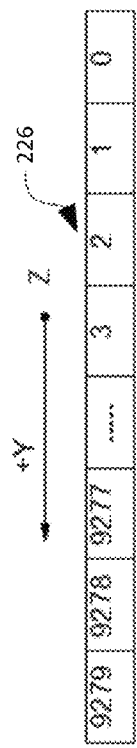
FIG. 3 is a diagram providing an example of a linear array of pixels of the detector of FIG. 2C.

In one specific embodiment, the detector array 220, depicted in FIG. 2C, includes ten rows 226 (or Lines, labeled from −1 through 8) of linear arrays of pixel elements of 9280 pixels each. Among the ten rows, only 8 rows of pixels are used during the scan, leaving two rows free. As shown in FIG. 3, each of the linear arrays 226 contains pixels numbered from 0 to 9279.

Figure 4A:
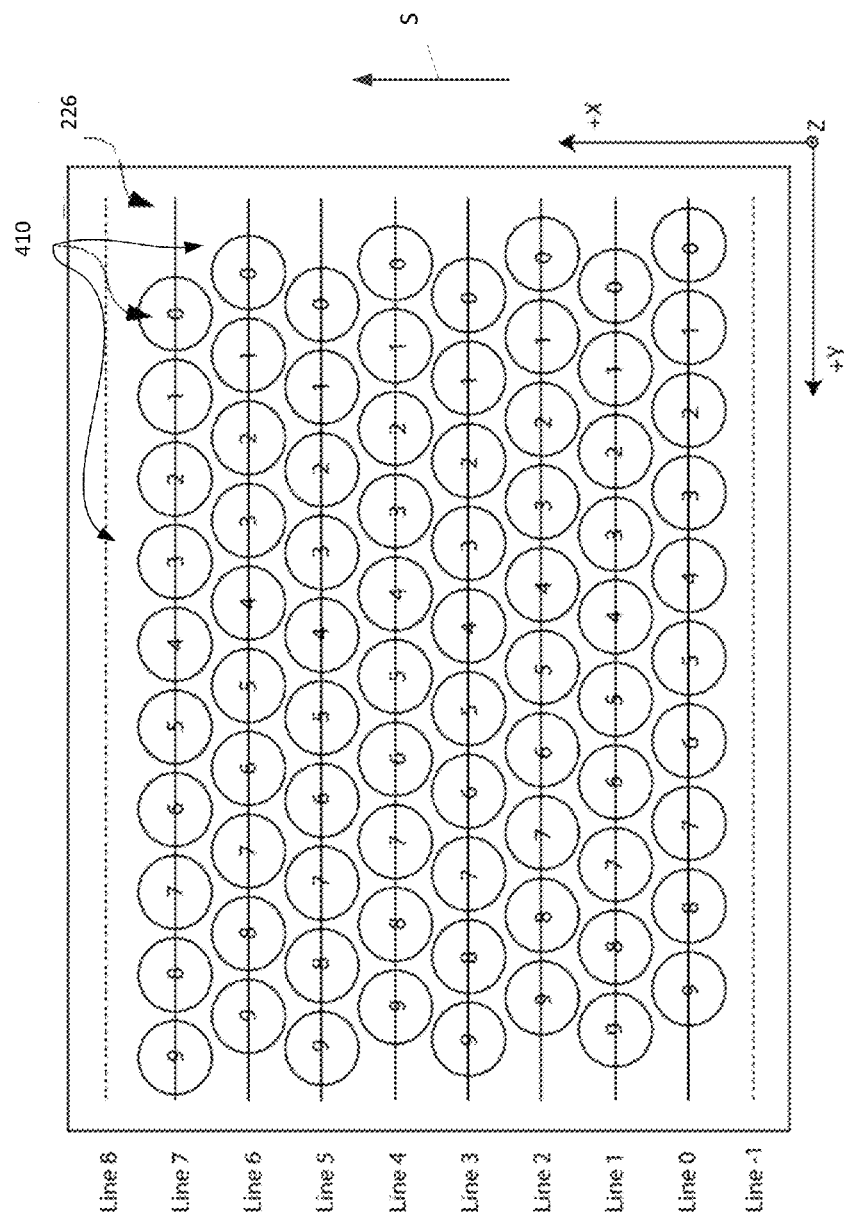
FIG. 4A is a plan top view of the microscope array of FIG. 2A, schematically depicting a composite layout of the projections of fields of view of individual microscopes in the AM of FIG. 2 arranged in a hexagonal pattern.

Referring again to FIG. 1, the physical spacing between immediately adjacent microscope objectives determines the number of microscope objectives that can be arranged across the width of the microscope slide. This spacing, as compared to the diameter of an individual objective's FOV, determines the number of microscope rows needed to form a composite field-of-view that equals the microscope-slide width and, accordingly, a composite image on the plane of the detector of the AM. Based on these considerations, the objectives of the AM 30 can be arranged, for example, as depicted in FIG. 4A in a quasi-hexagonal fashion with staggered rows. The staggered rows may be optionally aligned at a slight angle with respect to the direction of scanning S.

FIG. 4A illustrates an array of images 410 formed by individual microscopes from the AM 30 of FIG. 1 on a sensor (detector) plane 300. Corresponding to such arrangement, an object area on a standard microscope slide 228 can be imaged, for example, by an array 30 of 80 individual microscopes organized in 8 rows of 10 microscopes in each row, as shown. The arrays of images 410, representing images of the object within the FOV's of the individual objectives, are ordered from right to left, from 0 to 9, in a fashion similar to the fashion of ordering the detector pixels in FIG. 3. (The specific number of objectives, linear pixel arrays, number of detector pixels in an array are chosen for illustration purposes only, and the idea of the invention is applicable to practically any AM geometry in which the FOVs of at least two objectives overlap in the image plane).

When an object such as a tissue section on microscope slide is scanned (for example, in the S direction shown in FIG. 4A), a FOV corresponding to each objective of the AM is traced along the surface of the object and defines, on that surface, a corresponding strip or area equal in width to the FOV of the individual objective and in length to the span of the linear scan. The image of such strip of the object's surface formed by the individual objective is referred to herein as Raw Swath associated with such individual objective. The individual portion of an object, the strip imaging of which with the corresponding individual objective at hand results in a Raw Swath, is referred to as Raw Object. It is understood, therefore, that a given Raw Object and a corresponding Raw Swath are optical conjugates.

Figure 4B:
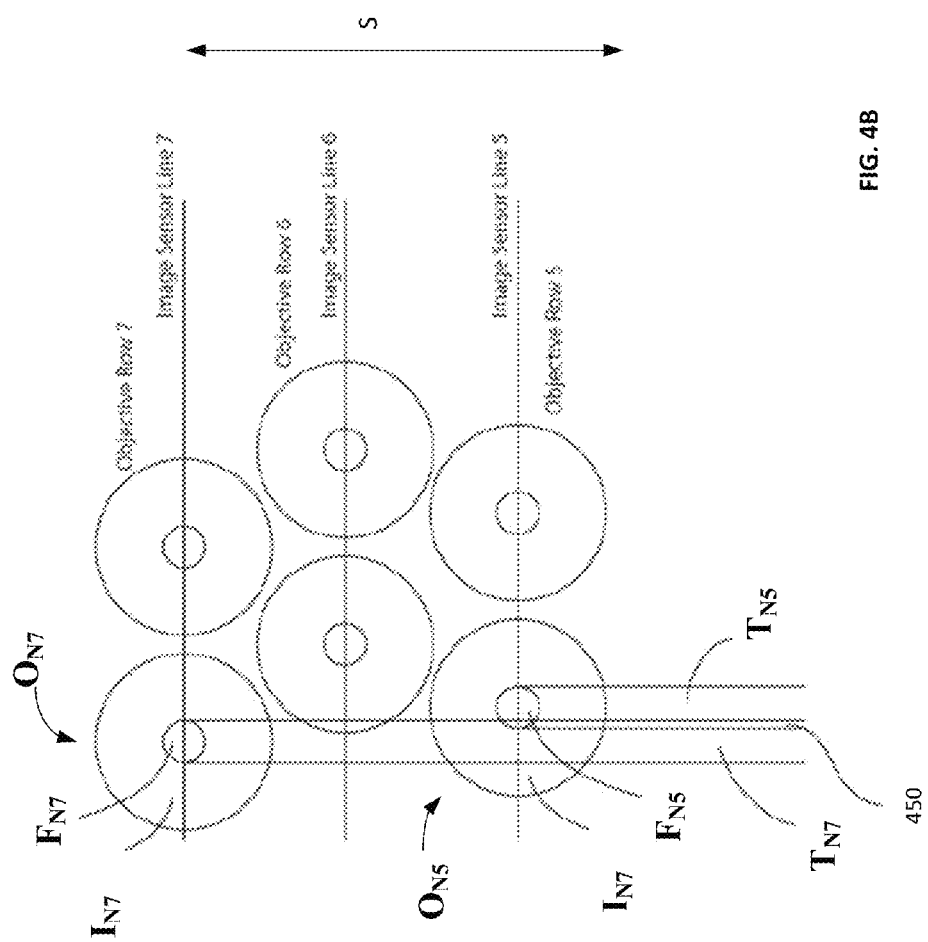
FIG. 4B is a simplified schematic representation of the fields of view of a portion of an array-microscope layout, in which individual microscope objectives are disposed in a substantially hexagonal pattern and, optionally, at a slight angle with respect to the direction of scanning, such that a complete coverage of the sample surface is achieved with a single linear scan.

Depending on the mutual positioning of the multiple objectives in the AM, the imaging conditions may be such that the respective FOVs of two objectives (that occupy the same sequential position in two different rows of the objective array of the AM) partially overlap. The illustration of the situation when the respectively corresponding FOVs of the two objectives that occupy the same position in a sequence of objectives in different rows of the objective array is provided in FIG. 4B. Specifically, the diagram of FIG. 4B depicts the overlap of the first trace $T_{N7}$, corresponding to the repositioning of the FOV $F_{N7}$ of an objective number N in an objective row 7 (denoted as $O_{N7}$) across the object during the scan, and the second trace $T_{N5}$, which corresponds to the repositioning of the FOV $F_{N5}$ of an objective number N in an objective row 5 (denoted as $O_{N5}$) across the object during the same scan. Objectives $O_{N7}$ and $O_{N5}$, the FOV's of which overlap in the object plane, are referred to herein as neighboring objectives. $I_{N7}$ and $I_{N5}$ represent the respectively corresponding instantaneous images (optical conjugates of $F_{N7}$ and $F_{N5}$) produced by the $O_{N7}$ and $O_{N5}$, respectively, and captured by the detector pixel array of Line7 and the detector pixel array of Line5. The overlap between the traces $T_{N7}$ and $T_{N5}$ is denoted as 450. It is understood that, as applied to the example of the AM shown in FIG. 4A, N varies between 0 and 9.

Regions of a given Raw Object along at least one of the boundaries of such Raw Object are imaged not only by the objective at hand but also at least one more objective of the AM. The central portion of the Raw Swath, which is imaged only by the objective at hand, is referred to herein as Image Swath. Notably, the number of pixels encompassed by each individual Raw Swath may not be the same (due to fabrication tolerances and alignment errors associated with the manufacture of the system 210 of FIG. 2).

Moreover, manufacturing tolerances may require that the immediately adjacent objectives in the AM be separated by a predetermined amount (or offset from one another). Some of the detector pixels registering light transmitted from the object through the array of objectives of the AM may remain unused and the optical data received from these "offset" or unused pixels has to be neglected for the proper assembly or concatenation of the final artifact-free image of the object.

Accordingly, the initial image (not shown) of the object as acquired during the AM scan by the detector, is a combination of (i) Image Swaths corresponding to individual objectives, and (ii) intertwined with such Image Swaths, at least one of (a) the "offset zones" of the image (corresponding to the regions of the object not covered by any FOV of any individual objective of the AM), and (b) the initial image regions in which an image of the object is duplicated by two objectives of the AM. The order in which the individual Image Swaths have to be stitched together and the order in which the "offset zones" of the acquired image have to be removed, to compensate for such the initial image artifacts, depend on the objective array geometry.

In the following discussion, the selected objectives in the AM of FIG. 4A are used as an example. Due to partial overlap of the FOVs corresponding to two objectives, the instantaneous images of these FOVs (produced by the two objectives on a chosen linear array of detector pixels) overlap as well. The same hold for the Raw Swaths (produced by the same two objectives across the whole span of the detector plane). For example, as Raw Object of the Objective 9 in Line0 ($O_{90}$) overlaps with that of the Objective9 in Line2 ($O_{92}$), and the Raw Object of the Objective9 in Line2 ($O_{92}$) overlaps with that of the Objective9 of Line 4 ($O_{94}$), and so on, the Raw Swath ($RS_{90}$) from Objective 9 in Line0 will be overlapping, in the image plane, with the Raw Swath ($RS_{92}$) of the Objective 9 in Line 2; the Raw Swath ($RS_{92}$) from Objective9 in Line2 will be overlapping with the Raw Swath ($RS_{94}$) of Objective9 in Line4, and so on. Raw Swaths from the FOVs that correspond to the objectives in a corresponding pair (such as, for example $O_{92}$ and $O_{94}$) overlap near edges of the swaths. Accordingly, the object features that are located near the edges of the FOV of a chosen objective appear in two neighboring instantaneous images and two neighboring image swaths.

Figure 5A:
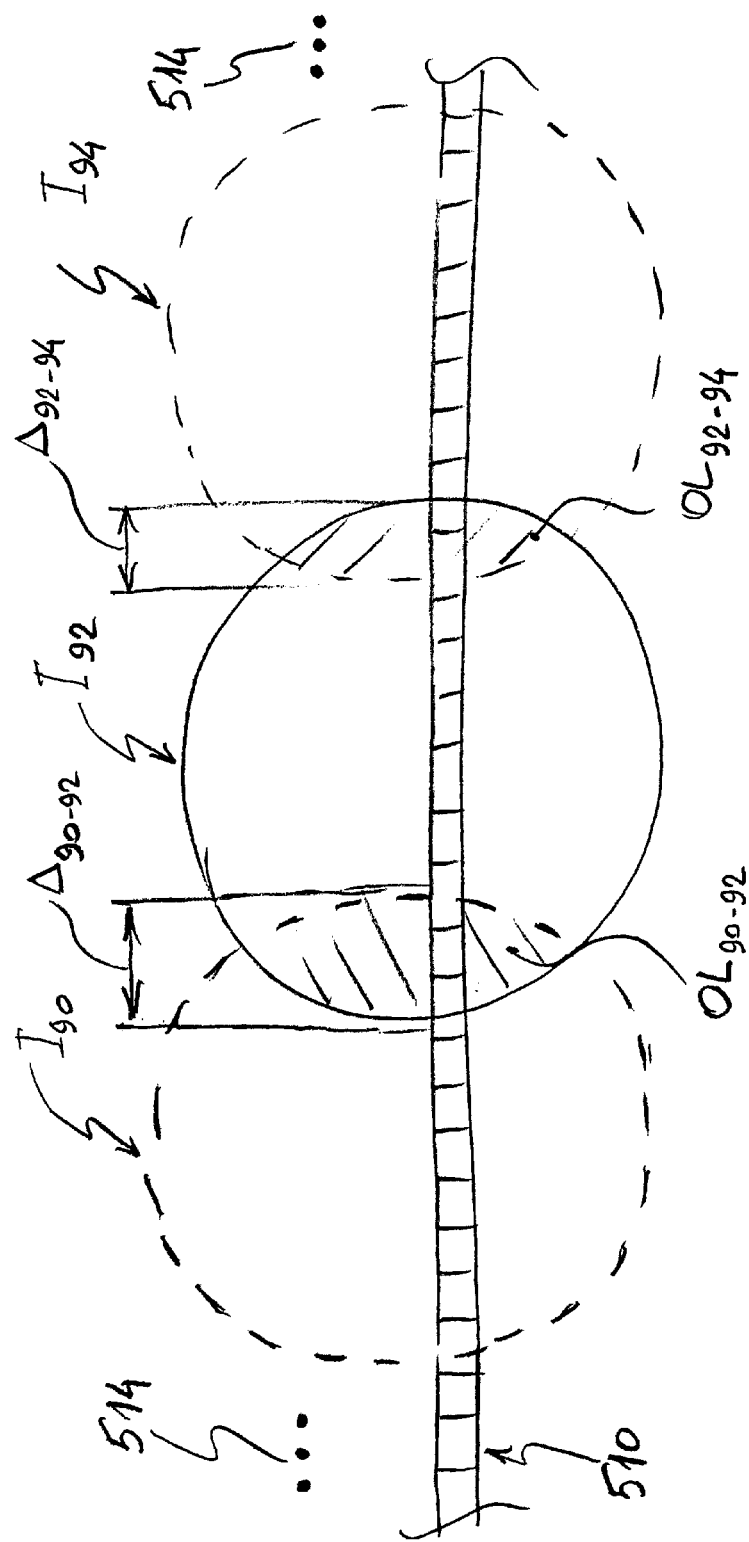
FIG. 5A is a schematic depicting a scanned section of the object overlayed on a diagram of a linear array of detector pixels.

This situation is schematically illustrated in FIG. 5A in reference to a chosen array of detector pixels 510 across which the arrays of objectives of the AM 30 are scanned. Here, $I_{XY}$ represents the instantaneous image formed by an ObjectiveX in LineY ($O_{XY}$) on a linear array of pixels 510, and ellipses 514 imply that further neighboring instantaneous images (corresponding to neighboring objectives) may be present. An area of overlap between the neighboring instantaneous images of the immediately neighboring ObjectiveX in LineY and ObjectiveX in Line(Y+2) are denoted, respectively, as $OL_{XY-X(Y+2)}$ (where X and Y are within the ranges defined by the number of objectives in a single line of the AM and the number of lines of objectives in the AM). The instantaneous images corresponding to the examples of three neighboring objectives in FIG. 5A are $I_{90}$, $I_{92}$, and $I_{94}$.

As already mentioned above, the calibration of the AM 30 requires that pixels $\Delta_{90-92}$ and $\Delta_{92-94}$ of the array 510 (that acquire, from the scanning AM, imaging data corresponding to the image overlap regions such as $OL_{90-92}$, $OL_{92-94}$) be appropriately assigned, for the purpose of forming an artifact-free image, between the ($O_{90}$ and $O_{92}$) and ($O_{92}$ and $O_{94}$), respectively. ($O_{90}$ and $O_{92}$) Denoting, as $\Delta_{XY-X(Y+2)}$, the group of pixels of the detector array that correspond to the area of the overlap between the instantaneous images formed by the ObjectiveX LineY (or $O_{XY}$) and ObjectiveX Line(Y+2) (or $O_{X,Y+2}$), the process of normalization and/or calibration of the AM 30 is directed to appropriate assignment of some of these pixels to the $O_{XY}$ and some of these pixels to the $O_{X,Y+2}$.

In the embodiment of this invention, in order to form an artifact-free composite image of the whole object, it is critical to determine the exact pixel number associated with the beginning and the ending of each Image Swath. As a result of calibration of the AM 30 and the pixel assignment, a first portion of each of the groups of pixels corresponding to an image-overlap region will be dedicated to only one of the immediately neighboring objectives producing overlapping Raw Swaths, and a second portion of the same group of pixels will be dedicated to another of the immediately neighboring objectives. As a result, light intensity values acquired by and read from the whole detector array will be mapped, by a processing element of the system 210 of FIG. 2, to non-overlapping Image Swaths.

Steps necessary to achieve such mapping are illustrated schematically in FIGS. 5B and 5C, for simplicity not with respect to the whole Raw Swaths, Image Swaths, and the whole detector array, but with respect to individual instantaneous images formed by immediately neighboring objectives at a chosen linear array of pixels 510. It is assumed that the generalization of this description to the scale of the whole detector array will be apparent to those skilled in the art from the context of the description. FIGS. 5B, 5C illustrate partially overlapping instantaneous images $I_{90}$, $I_{92}$, and $I_{94}$ discussed in reference to FIG. 5A in registration with the pixels of the linear array 510. Once the artifact-free portions (such as portions $I_{C,90}$, $I_{C,92}$, and $I_{C,94}$) of instantaneous images are determined for each objective from pairs of the immediately neighboring objectives, these artifact-free portions are further stitched across the detector array 220 to form the artifact-free Image Swaths. Then, by seamlessly stitching the individual Image Swaths, the complete composite image of the object (corresponding to the overall detector 220) is assembled. Alternatively, the artifact-free image portions of the individual imaged of the immediately neighboring objectives can be stitched along a chosen linear array of pixels (such as the array 510) to form an artifact-free representation of the object as seen by such array of pixels, followed by the stitching together the artifact-free image portions corresponding to individual arrays of pixels. Using the example of FIGS. 5A, 5B, and 5C, the artifact-free portions $I_{C,90}$, $I_{C,92}$, and $I_{C,94}$ of the instantaneous images $I_{90}$, $I_{92}$, and $I_{94}$ formed by the neighboring objectives as detected by the array 510 are stitched, as shown in FIG. 5C to form a an artifact-free portion of the composite image seen by the array 510.

Figure 10:
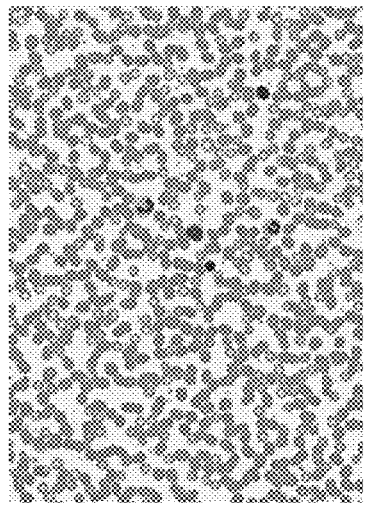
FIG. 10 is an image of a blood smear slide.

The determination of the number of pixels encompassed by each image swath is achieved during the scan that is referred to herein as a "FOV calibration scan". During the FOV calibration scan, it is preferred that an object with random features populating an area larger than the size of the array of objectives be scanned. One possible object suitable for FOV-calibration is a blood smear slide which produces images similar to the one shown in FIG. 10.

Embodiment of the method of the invention provides an algorithm for processing of image data acquired with a scanning AM. Referring again to FIG. 2, during such FOV-calibration scan, data from every pixel from each of the linear pixel arrays (from Line –1 to Line 8) are collected. As a result of such data acquisition, the irradiance reading of a given linear pixel array (for example, a linear pixel array corresponding to Line3 of the detector 220 of FIG. 2C) is, generally, represented by a curve substantially similar to the curve 610 of FIG. 6, in which the bands $H_9$, $H_8$, ... $H_0$ correspond to the high level of light intensity representing Raw Swaths formed by the set of objectives of the AM as they are scanned across the pixel array in LineN (in case on Line3, these would be Objective9 Line 3 ($O_{93}$), Objective8 Line3 ($O_{83}$), ... Objective0 Line3 ($O_{03}$). The areas of low intensity ($L_{98}$, $L_{87}$, ... ) represent the readings of the pixels of the detector array, in Line3, that correspond to positional offsets between the respectively corresponding immediately neighboring objectives.

Referring again to FIG. 5A, the initial image formed based on data collected from each linear array of detector pixels is then cut into Raw Swaths the number of which corresponds to the number of individual objectives (which, in the example of FIG. 4, is equal to eighty), and Raw Swaths corresponding to two objectives the FOV's of which overlap in the object space are cross-correlated, in corresponding pairs.

The geometrical extent of the areas of overlap of the individual Raw Swaths can be defined by performing cross-correlation of the two overlapping Raw Swaths to identify the boundaries of the areas of overlap in terms of specific numbers and position of detector pixels across the array of pixels. In further reference to FIG. 5B, for example, once the pixel group $\Delta_{XY-X(Y+2)}$ is identified, the allocation of the pixels from this group between the ObjectiveX LineY and Objective X Line(Y+2) is conducted, thereby defining the boundary pixels for the individual Image Swaths for each individual objective. Similarly, the sets of pixels of the detector array that correspond to the "offsets" between the immediately neighboring objectives in a given row of objectives are determined by identifying the numbers of the pixels not exposed by Image Swath from any of immediately neighboring objectives.

The AM system of the invention may be optionally complemented by a display device (such as a monitor or a printer, for example) adapted to present, to a user, a visually-perceivable representation of at least one of Raw Swaths, Image Swaths, and the final composite, artifact-free image of the object.

Figure 7:
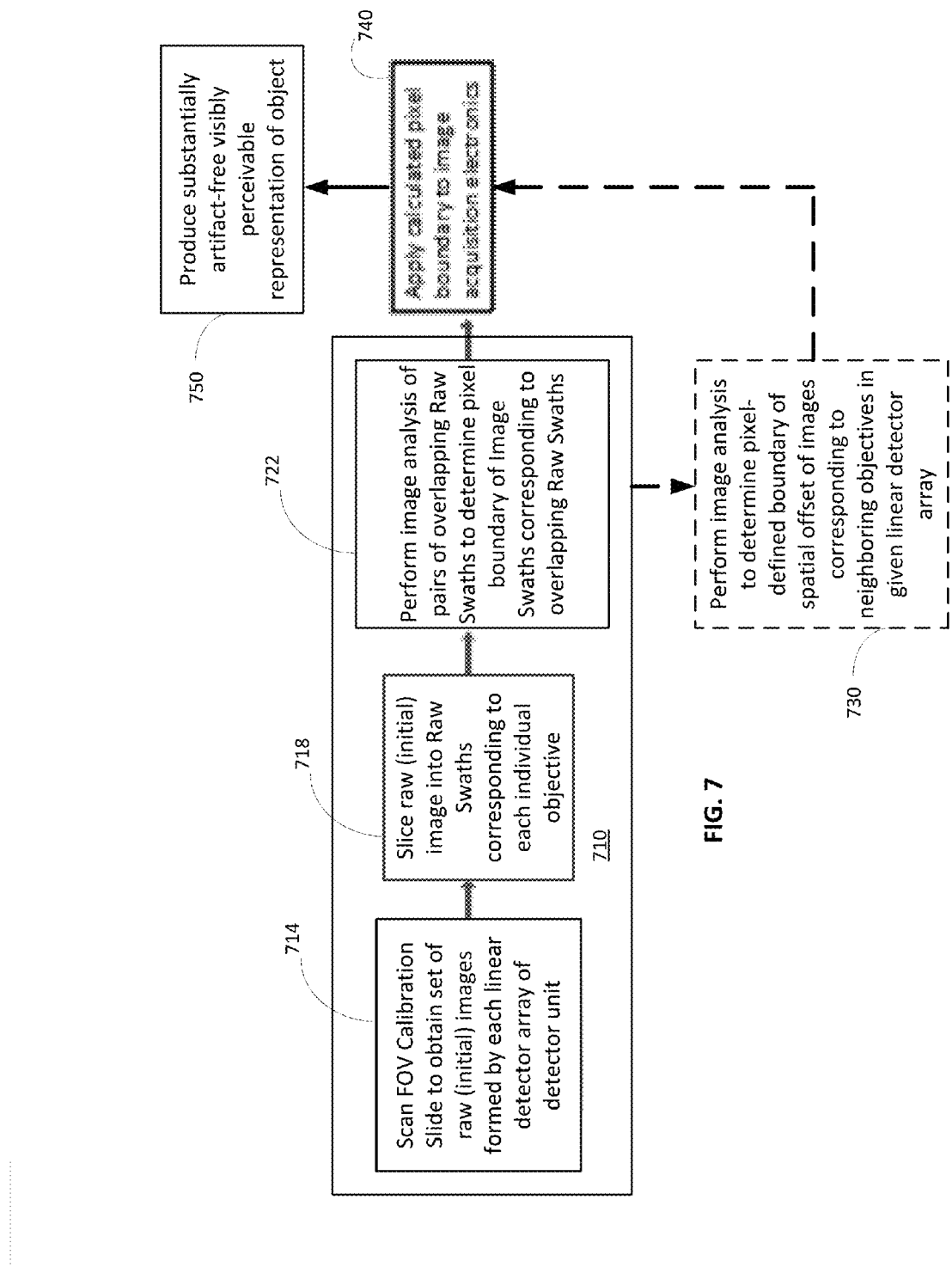
FIG. 7 is a flow-chart illustrating an embodiment of the invention.

The flow-chart illustrating a method of the present invention is shown in FIG. 7. Here, a group of 710 of data-processing steps is directed to the determination of the precise boundaries of each of the Image Swaths corresponding to each of the objectives 410 of the AM of the system 210. The group 710 includes at least step 714 of acquiring initial raw image by scanning of the object with a complete array of objectives of the AM; step 714, at which the initial image formed by a chosen linear detector array of the detector unit is subdivided into Raw Swaths corresponding to a row of objectives. The method additionally includes step 722 at which the determination of pixels defining boundaries of Image Swath produces by each objective of the AM, as well as the set of pixels corresponding to the region of overlap between two particular Raw Swaths, are determined by comparing the Raw Swaths in pairs as discussed above.

The group of steps 710 may be optionally complemented by step 730, at which pixels defining the portion of a given linear detector array that spatially corresponds to a region between the Raw Swaths of immediately neighboring objectives in a given row of objectives is identified and/or numbered. A portion of the algorithm corresponding to step 740 is graphically illustrated in FIG. 8 for a single line of linear image sensor, and is further complemented with optional steps 810 (subtraction of "dark offset"), 820 (gain correction), and 830 (remove header). All of the other lines or linear arrays of pixels are read out similarly across the field of the detector 220.

Once the beginning and the ending pixels identifying portions of the image formed by each individual objective are determined for each linear detector array (in the example of FIG. 2C—the arrays of Line –1 through Line 8), the numbers identifying these pixels (for example, their numbers in the overall pixel hierarchy of the detector array) are stored in a computer-readable tangible memory on the acquisition computer and applied during the scan as part of the Array Acquisition Algorithm. The Array Acquisition Algorithm governs how the signal values corresponding to individual pixels are read out from the imaging data acquired by a given linear detector array. The information obtained from the such calibration is fed to the Array Acquisition Algorithm in the format of number of pixels corresponding to a given Image Swath and number of pixels corresponds to the discarded pixels corresponding to "offset zones" between Image Swaths, for all of the objectives. In reference to FIGS. 7 and 8, numbers of pixels of the detector unit identified in steps 710 (and, optionally, 730) are further used at steps 740, 750 to stitch various Image Swath portions of the initial (raw) image to create a substantially artifact-free final image of the object.

Figure 8:
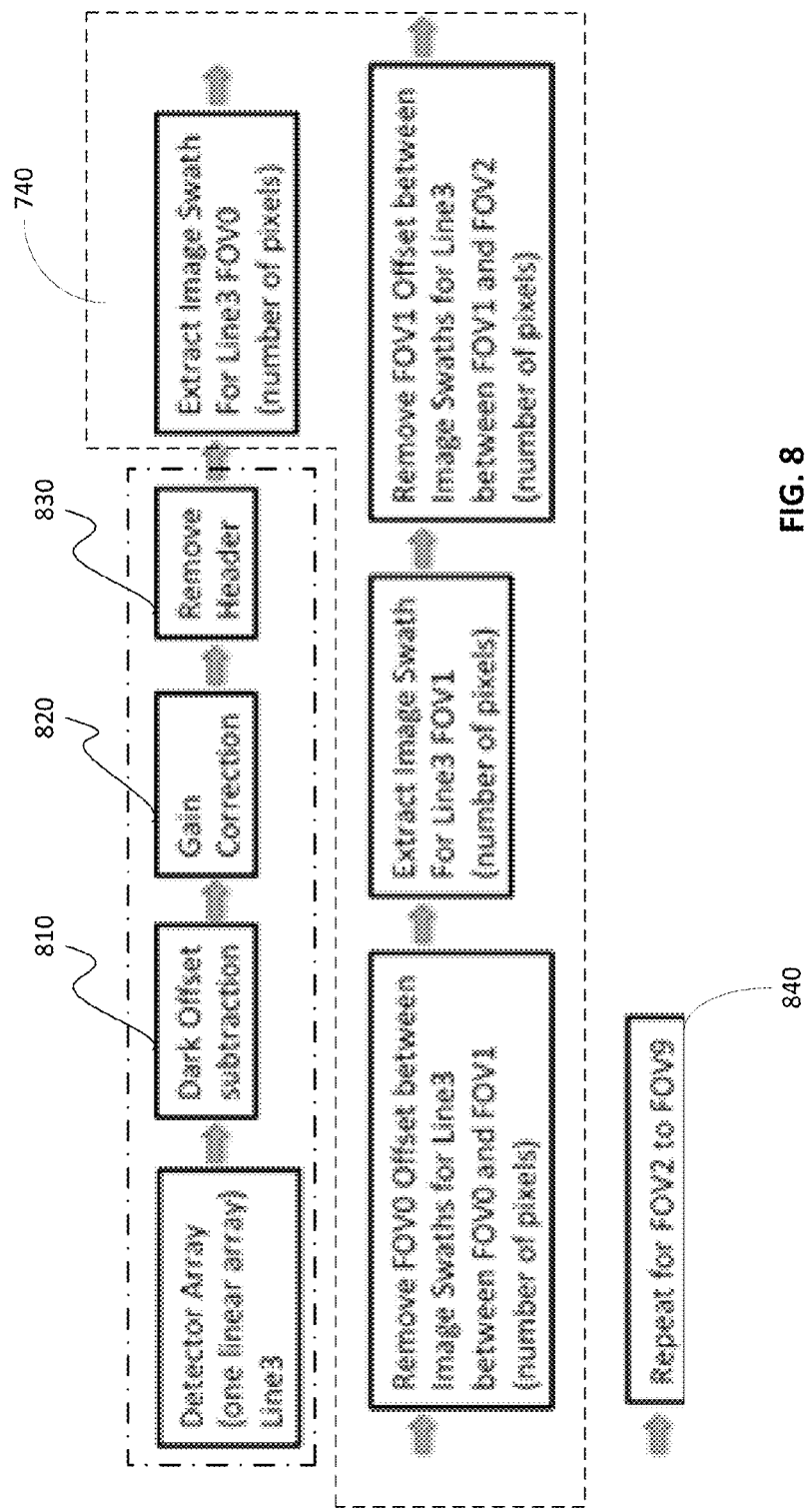
FIG. 8 is another flow-chart illustrating an embodiment of the invention.

A portion of the algorithm corresponding to step 730 is graphically illustrated in FIG. 8 for a single line or a single linear pixel array of the overall image sensor. All of the other lines of linear image sensors are read out similarly.

Figure 6:
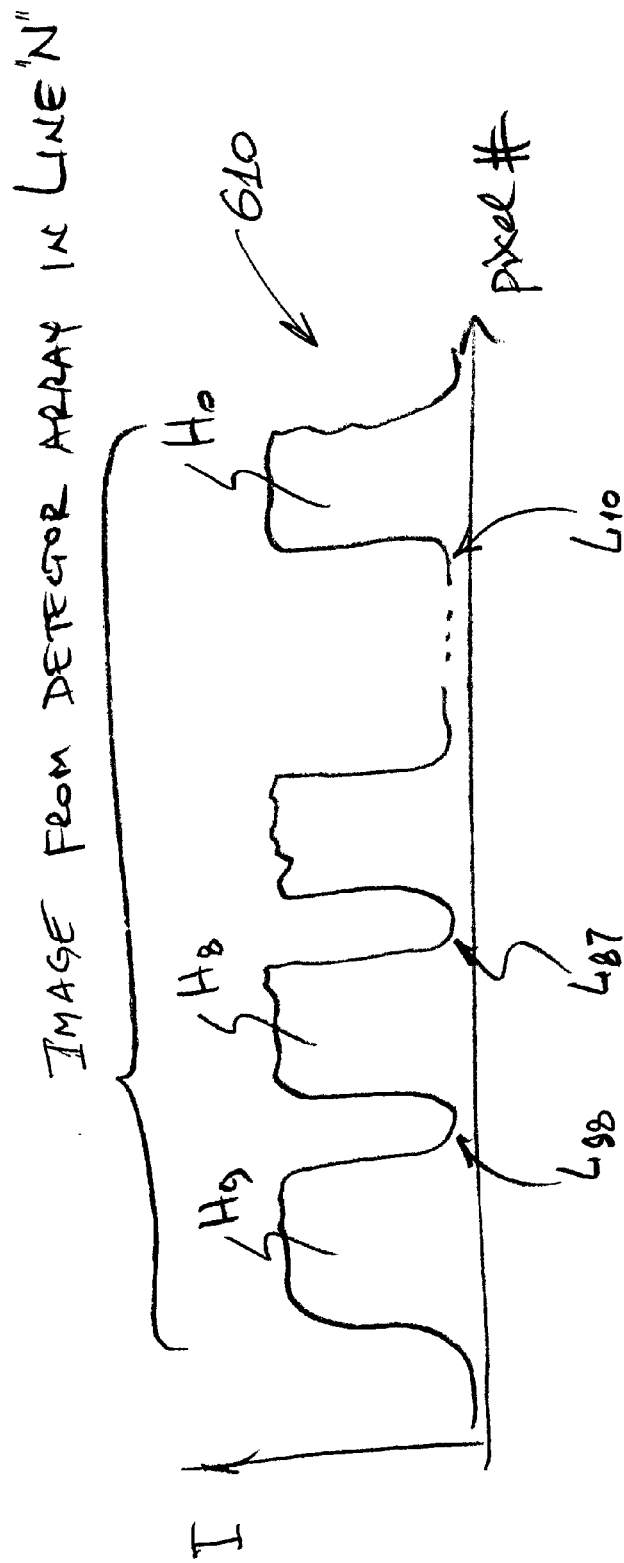
FIG. 6 is a plot demonstrating distribution of irradiance registered by a single linear pixel array of the detector in response to exposure of such pixel array to a row of microscope objectives during the scanning of the object along a linear direction of scan.
Figure 9:
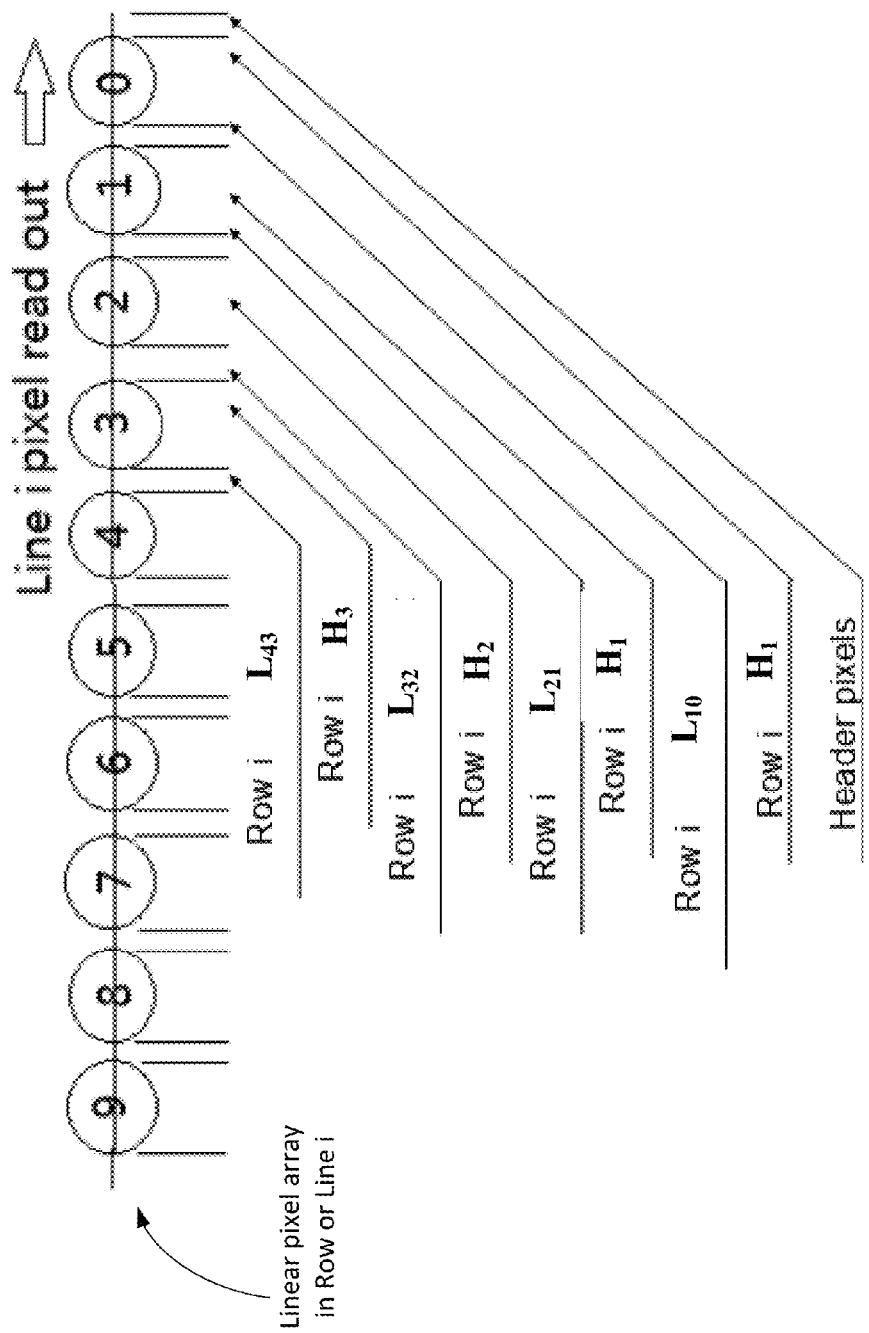
FIG. 9 is a diagram depicting an example of a read-out calibration format of a linear pixel array according to an embodiment of the invention.

Table 1 illustrates, in further reference to FIGS. 3, 6, and 9, an example of a read-out calibration format procedure in reference to the segmentation of the readings from a single linear array of pixels (such as the array 510). The reading from a single linear pixel array, saved on a tangible computer-readable storage medium, includes a Header and irradiance readings corresponding to $H_0$, $L_{10}$, $H_1$, $L_{21}$, $H_2$, ... $L_{98}$, $H_9$. The Header is the set of pixels starting with the pixel numbered 0.

TABLE 1

Linear Array of Pixels Read-Out File Format

| File Index | Size (bytes) | Value | Description |
|---|---|---|---|
| 0 | 4 | Signature | File signature of 'F', 'O', 'V', '\0' in ASCII |
| 4 | 2 | Version | Unsigned short specifying the version of the file format in which the data is stored |
| 6 | 4 | Detector Rows | Unsigned long specifying the number of rows on the detector |
| 10 | 4 | Detector Row Length | Unsigned long specifying the number of pixels in a detector row |
| 14 | 2 | Row 0 Length | Unsigned short specifying the number of individual instantaneous images in row 0 |
| 16 | 4 | Row 0, Offset for H0 | The position, in pixels, of the start of H0 in row 0 |
| 20 | 4 | Row 0, H0 Length | The number of pixels corresponding to H0 in row 0 |
| 24 | 4 | Row 0, H1 Offset | L10 |
| 28 | 4 | Row 0, H1 Length | The number of pixels corresponding to H1 in row 0 |
| ... | ... | Row 0, FOV * Offset & Length | All offsets and lengths for the Hs in row 0 |
| 14 + 8 * #H in row 0 + 2 | 2 | | Designations/Values similar to those above for each of the Rows of linear arrays of pixels |
| 16 | 4 | | |
| 20 | 4 | | |
| 24 | 4 | | |
| 28 | 4 | | |
| ... | ... | | |
| ... | ... | | |
| ... | 4 | End of File | End of file marker of 'E', 'O', 'F', \0 in ASCII |

At least some elements of a device of the invention can be controlled, in operation with a processor governed by instructions stored in a memory such as to enable desired operation of these elements and/or system or effectuate the flow of the process of the invention. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s).

What is claimed is:

1. A method of combining multiple swaths of images acquired with a scan of an object with a microscope array, the method comprising:
    enabling a relative movement between the two-dimensional microscope array and the object,
        wherein the microscope array has a plurality of magnifying imaging systems disposed along a corresponding plurality of optical axes and enabling formation of an image of the object on a detector, the plurality of magnifying imaging systems being arranged in a magnifying imaging systems array, the detector including a plurality of linear pixel arrays;
        wherein the positioning of magnifying imaging systems in the magnifying imaging systems array is such that such that each of the magnifying imaging systems acquires image data corresponding to a respective continuous strip of the object along the direction of scan, and
        wherein the linear pixel arrays are extended transversely to the linear direction of scan;
    scanning the object to define multiple image swaths of the object, each image swath having a width defined by a field of view of a corresponding magnifying imaging system in the array of magnifying imaging systems and a length defined by said direction of scan across the object;
    with each linear pixel array, acquiring imaging data representing individual images corresponding to intersections of multiple image swaths, formed by magnifying imaging systems, with each linear pixel array;
    determining spatial extents of the individual images and spatial offsets between the immediately-neighboring individual images from the acquired data;
    registering spatial extents and spatial offsets with respect to pixels of each linear pixel array to derive pixel parameters enabling a removal of distortions in imaging data representing the multiple image swaths; and processing the imaging data with data-processing circuitry of the microscope array to produce a composite image of the object based on said pixel parameters.

2. A method according to claim 1, wherein the processing includes forming multiple corrected image swaths from said multiple image swaths.

3. A method according to claim 2, further comprising stitching the multiple corrected image swaths.

4. A method according to claim 1, wherein the stitching includes stitching the multiple corrected image swaths to produce the composite image of the object that is devoid of (i) the distortions in the imaging data and (ii) image pixels not associated with any portion of the object.

5. A method according to claim 1, wherein the direction of scan across the object is linear and wherein the providing a two-dimensional microscope array includes providing a two-dimensional microscope array wherein the array of magnifying imaging systems includes rows staggered with respect to the linear direction of scan to organize the magnifying imaging systems in a substantially hexagonal pattern.

6. A method according to claim 1, wherein the determining spatial extent and spatial offsets include expressing said spatial extents and spatial offsets in terms of pixels of each chosen linear pixel array.

7. A method according to claim 6, wherein the registering includes:
in each group of pixels associated with each of the spatial offsets:
choosing a dividing pixel,
assigning all pixels of the group located on one side of the dividing pixel to one of the immediately-neighboring individual images to form a first clean individual image, and
assigning the dividing pixel and all pixels of the group located on another side of the dividing pixel to another of the immediately-neighboring individual images to form a second clean individual image.

8. A method according to claim 7, wherein the processing data includes producing the composite image of the object, the composite object being devoid of (i) image portions representing imaging of a portion of the object with more than one magnifying imaging system and (ii) image pixels not associated any portion of the object.

9. A method according to claim 1, wherein the processing data includes forming the composite image of the object that is devoid of image portions corresponding to imaging of a portion of the object with more than one magnifying imaging system.

10. A method according to claim 1, further comprising generating a visually-perceivable representation of at least one of the multiple adjacent image swaths of the object and the composite image.

11. An array microscope system comprising:
a two-dimensional scanning microscope array with a plurality of magnifying imaging systems disposed along a corresponding plurality of optical axes and enabling formation of an image of the object on a detector, the plurality of magnifying imaging systems being arranged in rows, the detector including a plurality of linear pixel arrays,
wherein the rows of imaging systems are staggered with respect to a linear direction of scan across the object to organize the magnifying imaging systems in a substantially hexagonal pattern such that each of the imaging systems acquires image data corresponding to a respective continuous strip of the object along said linear direction of scan, and
wherein the linear pixel arrays are mutually parallel and each is extended transversely to the linear direction of scan;
and
a microprocessor in operable communication with the two-dimensional microscope array, the microprocessor configured to:
acquire imaging data, received from each chosen linear pixel array as a result of scanning of the object along the linear direction of scan, said data representing individual images corresponding to intersections of image swaths, formed by magnifying imaging systems organized in a row, with each chosen linear pixel array;
determine spatial extent of each of the individual images and spatial offsets between the immediately-neighboring individual images from the acquired data;
register said spatial extents and spatial offsets with respect to pixels of each chosen linear pixel array to derive pixel parameters enabling a removal of distortion in imaging data;
seamlessly stitch multiple swaths of images that have been digitally corrected with the use of the pixel parameters to produce a composite image of the object that is devoid of image portions corresponding to imaging of the object with more than one magnifying imaging system.

12. A system according to claim 11, wherein the stitching includes applying said pixel parameters to spatially subdivide each of said multiple image swaths between first and second magnifying imaging systems, the first and second magnifying imaging systems characterized by having corresponding first and second fields of view that overlap at the object.

13. A system according to claim 11, wherein the microprocessor is further configured to generate a visually-perceivable representation of at least one of the image swaths and the composite image.

14. A system according to claim 11, further comprising
a scanning mechanism enabling a relative movement between the microscope array and the object, the scanning mechanism operating continuously along the linear direction of scan across the object, and
a display device, the scanning mechanism and the display device being operably connected to the microprocessor.

* * * * *